United States Patent
Bradley

[11] Patent Number: 4,730,673
[45] Date of Patent: Mar. 15, 1988

[54] HEATED BRINE SECONDARY RECOVERY PROCESS

[76] Inventor: Bryant W. Bradley, 3516 Stratford Dr., Norman, Okla. 73069

[21] Appl. No.: 521,433

[22] Filed: Aug. 8, 1983

[51] Int. Cl.$^4$ .............................................. E21B 43/24
[52] U.S. Cl. ................................... 166/272; 166/274
[58] Field of Search ............... 166/57, 244 C, 272, 166/273, 274, 303

[56] References Cited

U.S. PATENT DOCUMENTS

| | | | |
|---|---|---|---|
| 3,125,072 | 3/1964 | Brandt et al. | 166/272 |
| 3,414,507 | 12/1968 | Calmon | 166/272 |
| 3,435,898 | 4/1969 | Thompson | 166/274 |
| 3,703,928 | 11/1972 | Fulford | 166/274 |
| 4,094,798 | 6/1978 | Tate et al. | 166/274 |
| 4,156,545 | 5/1979 | Blanchard, Jr. et al. | 166/303 |
| 4,391,719 | 7/1983 | Meister | 166/274 |

*Primary Examiner*—Stephen J. Novosad
*Assistant Examiner*—William P. Neuder
*Attorney, Agent, or Firm*—Laney, Dougherty, Hessin & Beavers

[57] ABSTRACT

A high salt content oil field brine is treated for use in downhole secondary recovery of hydrocarbons by placing a scale inhibitor in the brine, then heating the brine by contact with a heat exchange medium having a temperature not exceeding 400° F. The amount of scale inhibitor used is the minimum amount effective to reduce the total amount of scale formation during heating by at least 90% as compared to the amount of scale formed under identical heating conditions and when no inhibitor is added to the brine.

16 Claims, 5 Drawing Figures

HEATED BRINE SECONDARY RECOVERY PROCESS

FIELD OF THE INVENTION

This invention relates to hot water flooding used in the secondary recovery of hydrocarbons from subterranean formations.

BRIEF DESCRIPTION OF THE PRIOR ART

In a paper entitled "Calcium Carbonate Scale Inhibition in Oil Field Brines" which I presented at the 1973 Annual Conference of the National Association of Corrosion Engineers, Mar. 19-23, 1973, I reviewed the prior art in the area of calcium carbonate precipitation inhibition, including the use of inorganic phosphate inhibitors for controlling scale in oil field brines. In that paper, I reported my investigations of the relationship of effective concentrations of scale inhibitors in such brines to the magnitude of a number of variables, including system pressure, ionic concentration, temperature, time and pH.

The reported investigations showed that there is a reduction in the scale-forming propensity of oil field brines upon increasing the pressure upon the brine. The investigation further showed that the concentration of inhibitor required to achieve complete inhibition (no scale formation) of brine increases with increasing temperature, and the inhibitor effectiveness decreases with time. From the data developed by the investigations, it was concluded that scale formation from oil field brines (as compared to the amounts required to inhibit scale formation in municipal waters at atmospheric pressure) could be effectively inhibited by the use of relatively low concentrations of several organic and inorganic inhibitors under conditions simulating the utilization of these brines in secondary oil recovery.

The use of heated oil field waters in the secondary recovery of petroleum is described in Waterman U.S. Pat. Nos. 3,262,500 and 3,186,484. Steam is utilized for heating the water charged to an injection well.

In the process disclosed in Brandt et al U.S. Pat. No. 3,125,072, brine is heated by direct heat exchange with hot gases preparatory to injecting it into the earth for purposes of secondary recovery. The patent disclosure does not contemplate the inclusion of any scale-inhibitor compound, per se, in the water, but does indicate that the propensity of scale-forming compounds to precipitate increases with increasing temperature, and that to suppress such precipitation, it may be desirable to add water softeners and to operate at elevated pressures.

In Wirth, Jr. U.S. Pat. No. 3,203,873, the patent is concerned with a method and apparatus for controlling scale formation in evaporators and heat exchangers used for processing sea water, brackish water or other saline liquid into fresh water. The patentee recognizes that as the temperature of these brackish waters increases, scale-forming compounds and ions become less soluble. It is proposed to add various ion exchange materials, both organic and inorganic, to soften the water, and thereby reduce precipitation of calcium and magnesium scale-forming ions by removing them from the solution. It is further proposed to initially heat the brine by indirect heat exchange between steam and the brine.

BRIEF DESCRIPTION OF THE PRESENT INVENTION

The present invention provides an improved method for carrying out secondary recovery of petroleum by the use of a heated oil field brine as a driving fluid. The method of pretreating and heating the brine is such that the secondary recovery can be carried out more efficiently and economically than in the case of methods previously proposed.

Broadly described, the method contemplates projecting an injection well and a producing well into the formation at horizontally spaced locations, and in conformity with conventional secondary recovery techniques. Any available oil field water, which will generally contain in excess of 1000 ppm total dissolved solids, and significant quantities of scale forming ions ($Ca^{++}$, $Mg^{++}$, $HCO_3^-$ and $SO_4^=$), is then treated with a water-soluble scale inhibitor compound. The amount or concentration of the scale inhibitor added to the water is the minimum amount which will be required to maintain at least 90% of the total potentially scale-forming ions in the solution during subsequent heating of the water to a temperature not exceeding 400° F., and at a pressure of from atmospheric to any pressure required to inject the water into the formation. The water, containing the described amount of scale inhibitor compound is then heated, preferably while the water is in motion through pipes or conduits, by contact with a heat exchange medium which, at the point of contact, has a temperature not exceeding 400° F., with the heating carried out at a pressure of from atmospheric to any required pressure, and preferably at least 200 psig. The heated water is then immediately pumped down the injection well and into the formation to displace hydrocarbons toward the production well.

The invention, as thus described, is based upon my determination that inhibition of scale formation in such waters is a surface phenomena occurring at the surface of the vessel, tube or pipe confining the water to be heated, and that an interrelationship exists between the degree of scale formation at such surfaces, the temperature of the surface, the chemical composition position of the water and the quantity of scale inhibitor included in the water. Where heat exchange systems have previously been employed in which there is a very large temperature differential across a heat exchange boundary, such as a pipe wall or the like in direct fired heat exchangers, the high temperature of the internal skin of the pipe or tube creates a condition requiring a substantially larger amount of scale inhibitor in order to prevent scale formation at this surface. For this reason, the present invention requires that the heat exchange medium which is in direct contact with the treated water, such as an internal pipe wall or the like, have a temperature which does not exceed 400° F., and is preferably less than 300° F. A temperature of this magnitude will generally be adequate to elevate the brackish water to a temperature which will be at least that which will be encountered in many subterranean environments where the water is to be used as the driving force in secondary recovery, and thus will substantially reduce the risk of scale formation on the surfaces of the hydrocarbon bearing formation.

In a preferred embodiment of the invention, heat exchange for the purpose of heating the treated brackish water is carried out by passing a heated fluid, such as steam, through a tubular heat exchanger in which the treated brine is passed through or around a plurality of tubes or conduits. By the use of steam, for example, to heat the tubes, the temperature at the walls of such tubes where they are contacted by the water to be heated can be maintained at a temperature not exceeding 400° F., and substantially lower, if desired. In this way, and assuming adequate residence time of the treated water to reach equilibrium conditions closely approximating the temperature of the contact skin of the heat exchanger tubes, the water can be brought to an adequately elevated temperature to be effectively used in the secondary recovery procedure so that the heated crude oil will have approximately the same viscosity as the hot water and thus be displaced by it without by-passing.

This procedure permits the total quantity of inhibitor compound which must be employed to be reduced very substantially as compared to the amount of inhibitor required if direct fired heat exchange devices were utilized in which a very hot heat exchange medium (i.e. 2000°-2500° F. in a direct fired flame heater) were placed externally of the heat exchanger tubes.

An important object of the invention, as thus described, is to substantially improve the economy with which secondary recovery can be carried out where the driving medium to be utilized in the subterranean formation is an available oil field brine or brackish water.

A further object of the invention is to improve the efficiency of secondary recovery processes using oil field brines and brackish waters by permitting the equipment employed to be utilized over extended periods of time without the necessity to deal with undesirable scale formation in heat exchange elements, in the tubing string of the injection well, or in the formation itself.

Additional objects and advantages will become apparent as the following detailed description of the invention is read in conjunction with the accompanying drawings which illustrate a preferred embodiment of the invention.

GENERAL DESCRIPTION OF THE DRAWINGS

FIG. 5 is a schematic illustration of a different apparatus useful in practicing the method of the invention.

DETAILED DESCRIPTION OF A PREFERRED EMBODIMENT OF THE INVENTION

Figure 1:
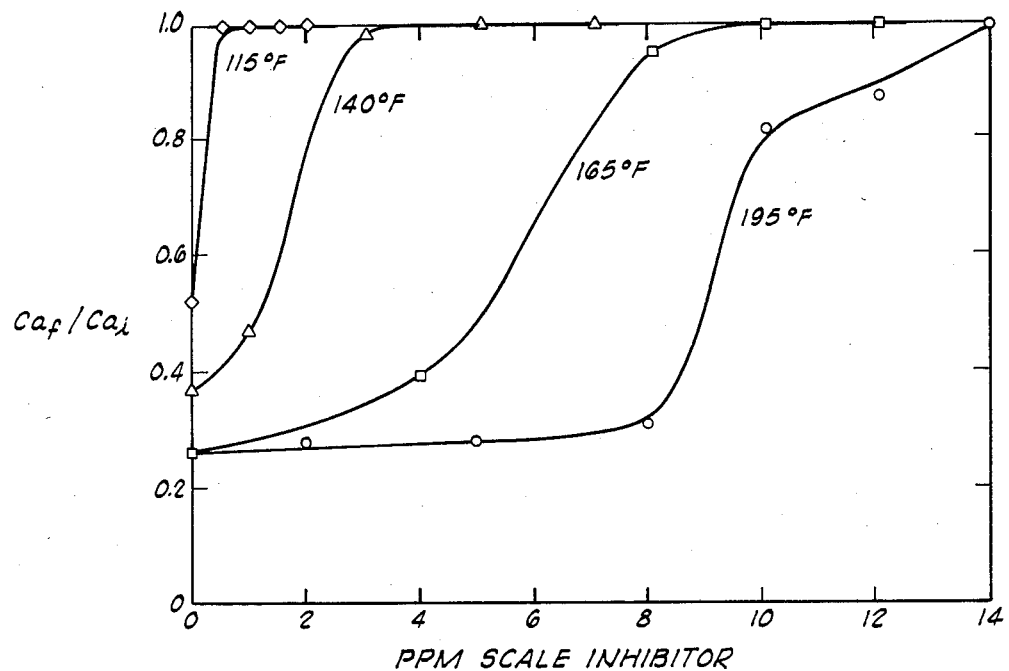
FIG. 1 is a graphic plot of scale inhibitor concentration against effective inhibition ratio, $Ca_f/Ca_i$, in an oil field brine when the brine is heated to temperatures of 115° F., 140° F., 165° F. and 195° F. at a pressure of approximately 1230 psig.

In petroleum production, it is a common occurrence to produce with the oil, water having a high salt content (hereinafter termed brine). Moreover, oil-free brines are frequently found in non-oil bearing formations in many oil fields. The brine may be encountered during the drilling of primary wells, source wells or injection wells to be used in secondary recovery. Whatever the source of brine waters in the oil field, disposal is a problem because the high salinity dictates care and selectivity in disposition in order to avoid undesirable or illegal pollution.

It has been proposed to use oil field brine as a driving medium in secondary recovery, thereby disposing of the brine without pollution of the area, and without the need for transport to a remote disposal location. Concurrently, a significant benefit is derived from the use of the brine in recovering residual hydrocarbons. It is recognized that it may become desirable to heat the drive water to be used in secondary recovery so that the viscosity of the driven residual petroleum at the driving fluid interface is reduced to the point of very similar viscosities of the petroleum and hot water. Ease of efficiency of displacement of the oil toward a producing well is thereby enhanced because fingering of the water through the petroleum, thus leaving some of the petroleum unrecovered, is largely alleviated.

A problem is encountered in the heating and downhole pumping of most oil field brines, however, as a result of the presence in such waters of significant concentrations of scale forming ions. Principal of these are the $Ca^{++}$, $Mg^{++}$, $HCO_3^-$ and $SO_4^=$ ions, which are present in widely varying concentrations in nearly all oil field brines. Such brines may have a total dissolved solids content ranging from about 1500 ppm up to about 200,000 ppm, and may contain a total calcium and magnesium ion content of from about 50 mg/l to about 20,000 mg/l. These ions are often deposited from solution as solid encrustations (scale) on pipes, boiler tubes, and within the interstices of the subterranean formation. The scale compounds formed include calcium and magnesium carbonates, calcium sulfate and magnesium hydroxide. These compounds decrease in water solubility as the temperature of the water increases. Thus, where pre-heating of the brines in direct fired boilers is carried out, severe scaling of the heat exchange tubes will often result where adequate inhibition has not been achieved through the addition of effective amounts of a scale inhibiting compound. In some instances, too, where minimal or no heating has been carried out at the surface before pumping the brine down the injection well, the relatively high temperature of the earth at producing formation depth warms the brine increasingly at proportionately greater depths, making it supersaturated with respect to the scale-forming ions carried in solution. As a result, scale not only forms on the injection well tubing, but also quite detrimentally plugs the interstices of the rock.

As a measure of the tendency of oil field brines to precipitate calcium carbonate scale, Stiff and Davis in 1952 empirically tested a number of brines and developed a Stability Index with indices ranging from −0.5 up to +2.0. (Stiff, H. A. and Davis, L. E., A Method of Predicting the Tendency of Oil Field Waters to Deposit Calcium Carbonate, Am. Inst. of Mining, Met. and Petroleum Engr. Petroleum Transactions, V. 195, 1952). The present invention is especially useful for waters having a Stability Index exceeding +0.1.

To alleviate the undesirable formation of scale during brine injection, it has been proposed to use various types of scale inhibitors, most notably sodium hexametaphosphate and tripolyphosphate compounds. Many organic inhibitors have also been studied and found effective.

Studies have shown that oil field waters vary widely in their scale-forming propensity as a result of great variation in dissolved solids content. I have determined that the amount of a given inhibitor which is required to prevent scale formation in a given brine increases with increasing temperature of the brine, and decreases with increasing pressure. My investigations have further shown that scale forms less readily upon a smooth boundary surface than upon one which is roughened or characterized by discontinuity. In accordance with this invention, a brine or brackish water is used in secondary recovery after it has been treated and heated to provide maximum effectiveness as a drive medium at minimal treatment cost. This is achieved by using the lowest effective temperature for the secondary recovery displacement and the minimum amount of inhibitor compound which is required to achieve at least 90 percent total inhibition at that temperature.

Figure 2:
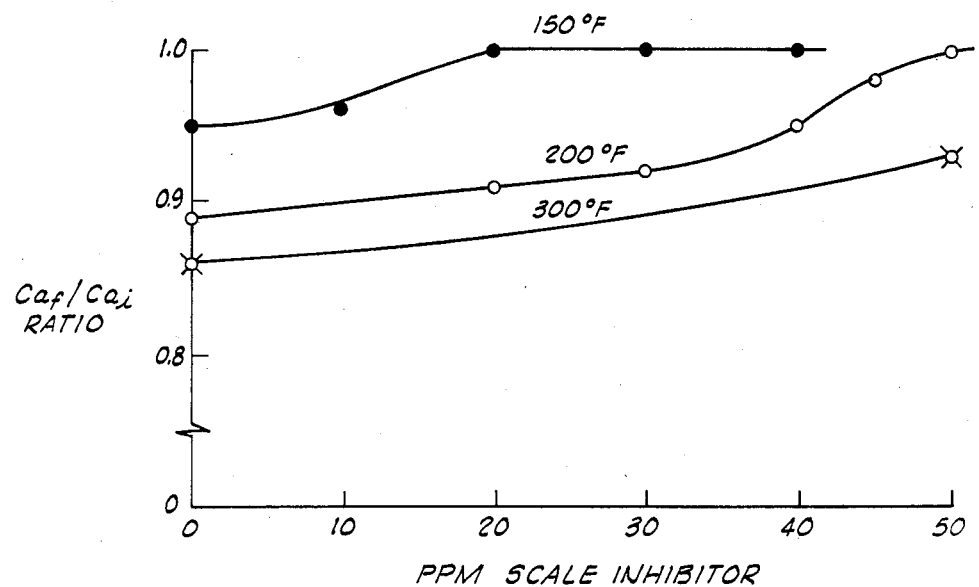
FIG. 2 is a graphic plot similar to FIG. 1, but based upon data obtained by heating a different oil field brine to different temperatures (150° F., 200° F. and 300° F.) at a pressure of 60 psig, and using a different scale inhibitor compound.

FIGS. 1 and 2 are graphs which illustrate the effect which the temperature to which the brine is heated has upon the amount of scale-inhibitor compound which is required in order to prevent scale from forming. The degree of inhibition achieved by each inhibitor concentration (in ppm) was measured by dividing the final calcium ion concentration, $Ca_f$, after the solution reached a particular temperature (or after it had been at a particular temperature for a given period of time) by the initial calcium ion concentration, $Ca_i$, before temperature exposure. Thus, $Ca_f/Ca_i=1.0=100\%$ inhibition. The steel bomb apparatus described in my U.S. Pat. No. 3,470,735 was used to carry out the experiments.

In the tests from which the data portrayed in FIG. 1 were derived, an oil field brine containing 30161 ppm total dissolved solids, 3166 ppm bicarbonate ions and 684 ppm calcium ions (2,595 ppm bicarbonate ions and 1,710 ppm calcium ions, reported as calcium carbonate equivalents) was treated with various concentrations of a commercially available liquid organic phosphonate inhibitor in a series of runs carried out at various temperatures. Each of the test runs was carried out at a pressure of about 1230 psig. The results of these tests, as plotted in FIG. 1, show that substantially less inhibitor is required to achieve 100% inhibition of the oil field brine when the brine is heated to a relatively lower temperature. Thus, for example, about fourteen (14) times as much inhibitor is required to achieve 100% inhibition of the brine when the brine is heated to 195° F. as compared to that which is required to achieve total inhibition when the brine is heated to 115° F. The data also show that the amount of calcium carbonate scale formation which occurs without the inclusion of any inhibitor in the brine increases up to a temperature of 165° F. Further elevation of the temperature, holding all variables constant, causes no additional calcium carbonate precipitation.

FIG. 2 further demonstrates that a relatively smaller amount of scale inhibitor is required in order to achieve total inhibition and prevent scale formation when an inhibited brine is heated to a relatively lower temperature. In the tests carried out to obtain the data plotted in FIG. 2, Tretolite SP-181, a commercially available liquid organic inhibitor, marketed by the Tretolite Company, was employed as the scale inhibitor and the treated brine contained 4660 mg/l sodium ions, 1580 mg/l calcium ions, 190 mg/l magnesium ions, 9600 mg/l chlorine ions, 760 mg/l bicarbonate ions and 650 mg/l of sulfate ions. The inhibited brine used in the tests was heated to the temperatures indicated in the graph of FIG. 2 for a period of two hours at a pressure of 60 psig.

Figure 3:
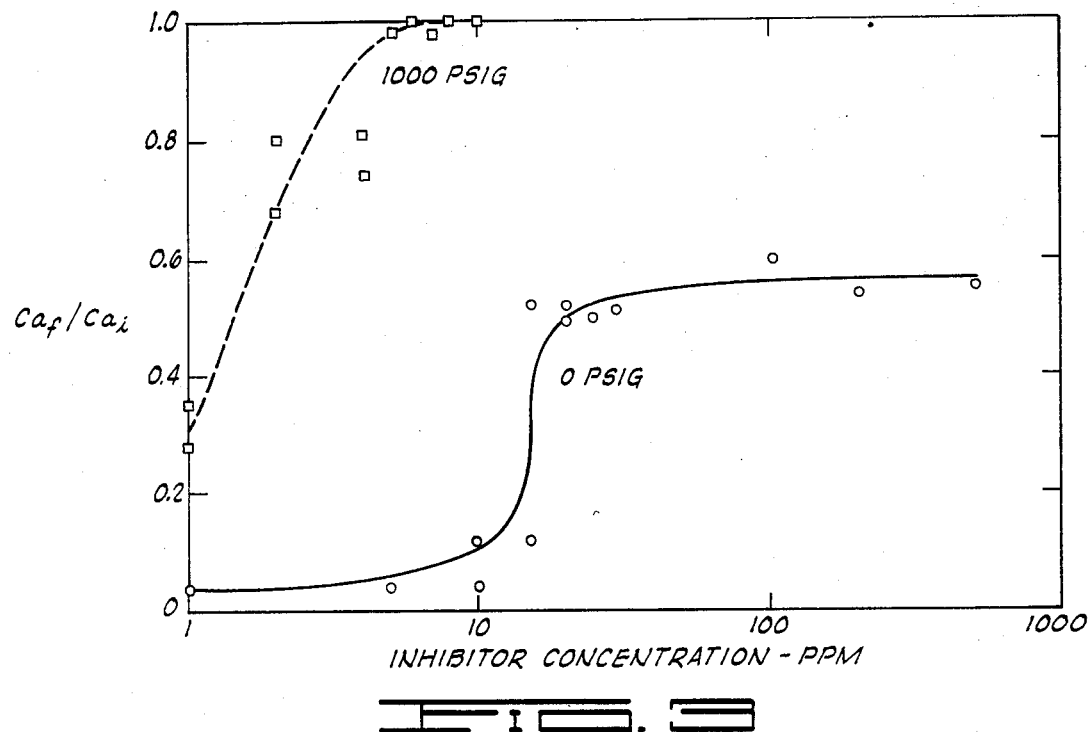
FIG. 3 is a graphic plot similar to FIGS. 1 and 2, but based upon data obtained when heating an oil field brine to 195° F., with heating carried out at two different pressures, and using varying concentrations of the same scale inhibitor compounds used in FIGS. 1 and 2.

The graph depicted in FIG. 3 demonstrates that, when the same oil field brine described in referring to FIG. 1 was inhibited with various concentrations of the liquid organic scale inhibitor, and test runs were carried out at 195° F. and at two different pressures, increasing the pressure on the heated brine reduced the amount of inhibitor which was required to achieve total inhibition.

On the basis of the described test results, the present invention proposes to pre-treat oil field brines in an improved manner for use as a secondary recovery drive medium, and to use the brines so treated for this purpose. In order to minimize the amount of scale inhibitor compound which must be added to raw brines to achieve total inhibition, the system of the invention utilizes a heat exchange arrangement in which the heat exchange interface is retained at a relatively low temperature, and residence time of the brine in contact with the heat exchange surface or interface is lengthened sufficiently to achieve a substantially equilibrium condition in which the brine approaches the temperature of the heat exchange interface. In the course of heating, pressure is maintained on the brine which is adequate to provide the necessary driving force in the formation, and preferably, is the maximum pressure which can be tolerated without fracture of the overburden, or other deleterious effects. It is further preferred that the heat exchange by which the brine is heated, where carried out in a tube bundle or in pipes which are heated by a heat exchange medium, be conducted in pipes which have a relatively smooth internal surface free of discontinuities.

In a preferred embodiment of the invention, the oil field brine is first filtered to remove any suspended (non-dissolved) solids, and is then passed through one or more heat exchange tubes or pipes which are heated by external contact with fluid, preferably steam, to a temperature not exceeding 400° F., and preferably less than 300° F. The pipes are preferably heated after the admission of pressurized brine thereto so that the internal surface of the pipe with which the brine is in contact is at a temperature close to that of the external heat exchange medium when the brine is admitted to the pipe. The pipe is of sufficient length that the residence time of the brine in contact with the internal surface of the pipe is adequate to elevate the brine to a temperature substantially approaching that of the steam or other external heat exchange medium. In the course of the heating of the brine, a pressure is preferably maintained on the brine which is equivalent to that at which the brine will be pumped down an injection well and into the formation for secondary recovery purposes. Preferably, the pressure employed exceeds 200 psig. In most instances, it will be undesirable to exceed a pressure that would cause breaking down or fracturing the hydrocarbon producing rock. In general, the pressure utilized will not exceed 4000 psig. Since the solubility of scale forming ions increases with increasing pressure, it is desirable to use the maximum pressure which can be tolerated by pipe and tubing systems, and by the formation.

Figure 4:
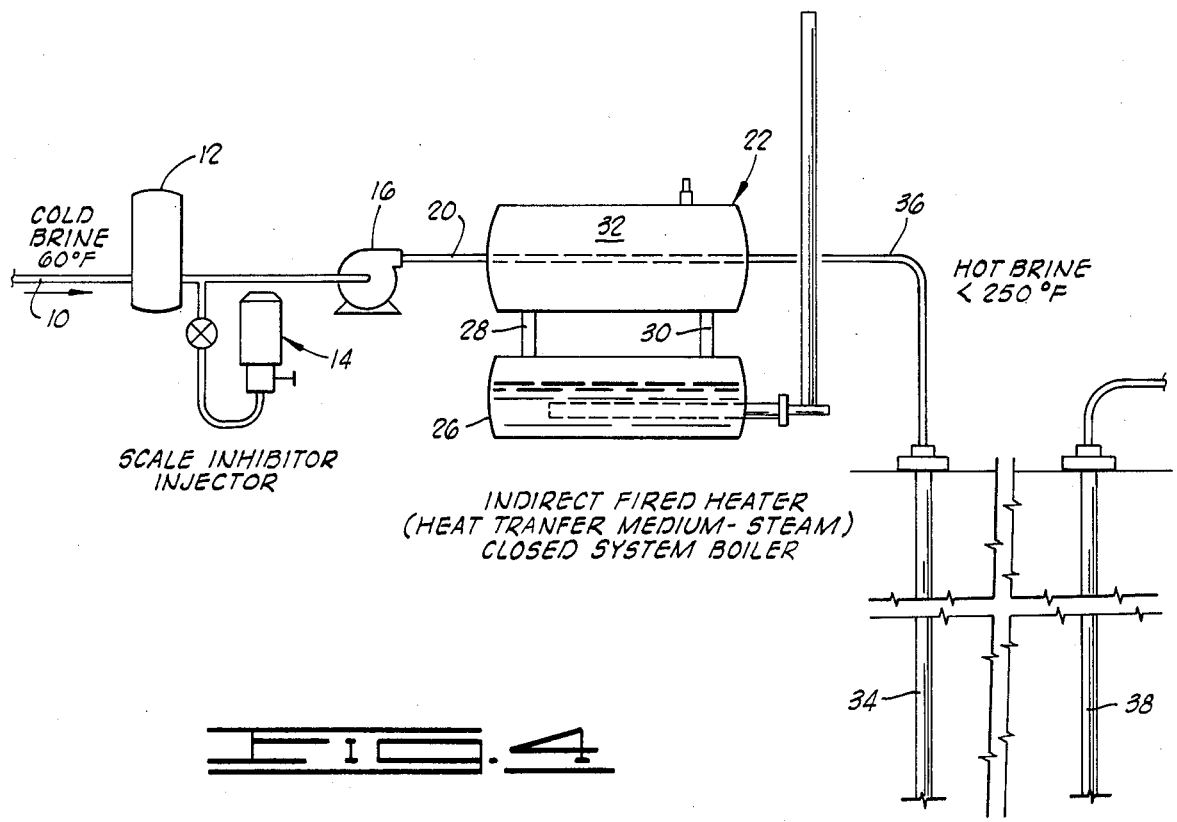
FIG. 4 is a schematic flow diagram illustrating typical practice of the process of the present invention.
Figure 3:
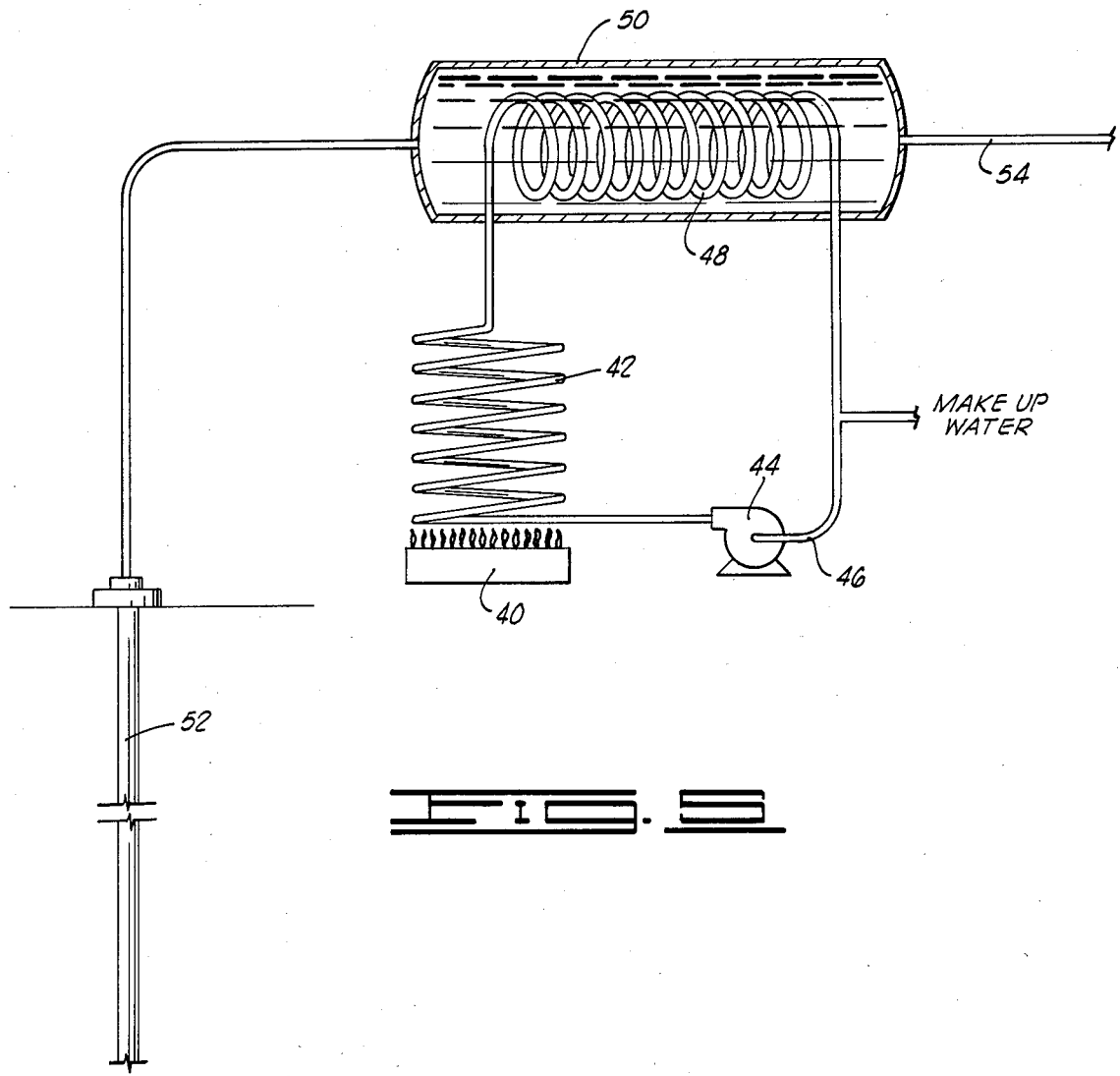

One type of heating system constructed in accordance with the present invention is illustrated in FIG. 4 of the drawings. As there shown, cold oil field brine at a temperature of about 60° is introduced to the system via pipe 10 and is passed through a filter 12 and then to a point where a water soluble scale inhibitor is added to the brine from a suitable injection apparatus 14.

Various organic and inorganic water soluble scale inhibitors can be utilized and many effective inhibitors are well known in the art. Examples of suitable water soluble inhibitors for use in the invention include water soluble alkali metal phosphonate and diphosphonate salts, amine phosphates, phosphate esters, and inorganic phosphates. Polyacrylates of the formula

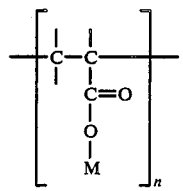

where M represent hydrogen, monovalent metal or ammonium groups and n may vary from 10 to 10,000 repeating units, can also be used. Preferred scale-inhibiting compounds are the alkali metal polyphosphates, phosphate esters and aminomethylenephosphonates (AMP) containing the linkage

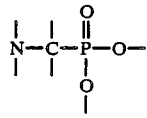

The most preferred inhibitors are monoaminomethylenephosphonate and ethylenediaminomethylene phosphonic acid.

The amount of the scale inhibitor which is introduced to the cold brine will, as previously pointed out, depend upon several variables which can be quickly evaluated in the laboratory. The "salinity" or total dissolved solids, and the calcium, magnesium, sulfate and bicarbonate ion content of the brine will, of course, be important to the amount of scale inhibitor which is added. As shown by the prior discussion, it will also be important to have a reasonably close estimate of the minimum pressure which will be utilized in forcing the treated brine down the injection well during the secondary recovery process, and the maximum pressure at which the brine will be injected into the oil-containing formation. Last, the maximum temperature which the particular secondary recovery project dictates should be known in advance, and the amount of scale inhibitor used for treating the brine governed accordingly. The appropriate temperature is one at which the viscosities of the hot water and heated crude oil are approximately equal. Thus, the hot water can displace the oil towards the producing oil well without fingering through, or bypassing, the oil. Oil recovery is thus improved over the well known water flooding with unheated water.

After adding the minimum amount of scale inhibitor which is required to achieve total scale inhibition, and based upon the temperature and pressure to be employed, the brine is pressurized by the use of a pump 16 to bring the brine under treatment to a pressure which is substantially equivalent to the maximum pressure which can be withstood by the formation in which the brine drive medium is to be used and/or by the piping and conveyance system through which the brine will be transmitted into the formation. Preferably, the pressure employed will exceed 200 psig, but will not exceed a pressure that would fracture the formation. In general, the pressure will not exceed 4000 psig.

The pressurized brine is then charged through the conduit 20 to a heat exchanger system 22 which, in the preferred embodiment of the invention illustrated in FIG. 4, includes an indirect fired heater. In the indirect fired heater, steam is generated from pure water in vessel 26 in any suitable fashion, and is passed by conduits 28 and 30 into heat exchange chamber 32. The steam will be heated to a temperature of between 212° F. and 250° F. at a pressure of 15 psig, depending upon the requirements of the secondary recovery project at hand. This steam generation system can be operated unattended. (As will be herinafter explained, the system illustrated in FIG. 5 can be utilized where higher temperatures are required.)

In the heat exchange chamber 32, the pipes or tubes through which the brine containing the inhibitor and under the described pressure is flowing are heated by external contact of the pipes with the circulating steam. Preferably, the pipes are not heated in advance of the introduction of the brine. It is preferred that the pipes or tubes in the heat exchange chamber 32 be relatively thin-walled, and that these tubes have a relatively smooth internal surface free of discontinuties. The extent of the tubes or pipes in the heat exchange chamber 32 is such that the residence time of the brine in the tubes and during the heat exchange phase of the process is sufficient for the brine to be brought up to approximately the same temperature as the steam heat exchange medium.

After the heated brine leaves the heat exchange chamber 32, it is transferred directly to an injection well 34 via pipe 36 and is injected into the hydrocarbon bearing formation for purposes of providing the driving medium required to both lower the viscosity of residual hydrocarbons in the formation, and to force the hydrocarbons toward a producing well 38 spaced from the injection well in conventional fashion.

Another system which can be employed for heating the treated injection water is illustrated in FIG. 5 of the drawings. Here a gas-fired burner 40 is utilized for heating water and converting the water to steam in a steam coil 42. A pump 44 located in the line 46 directing water to the coil elevates the pressure in the system sufficiently that the steam/water mixture can be heated to as high as 400° F. The steam passes from the steam coil 42 to a heat exchange coil 48 located inside a heat exchange tank 50. The treated water which is to be piped to an injection well 52 is introduced to the tank 50 by means of a conduit 54 which carries the water to the tank 50 from the pressurizing pump 16 before described.

The system illustrated in FIG. 5 can also be operated unattended, if necessary or desired, by reason of the protection afforded to the coils and lines through which the steam is passed during the heat exchange operation. The system depicted in FIG. 5 is useful in those instances where high temperature steam is desired in order to bring the injected brine to a relatively higher temperature while adhering to the principle of the invention that the heat exchange surface with which the injection water to be heated is in contact is to be maintained at the lowest temperature which is compatible with anticipated heat losses during conveyance to the formation under circumstances confronted in a particular secondary recovery project, and the particular viscosity of the crude oil which is to be displaced in the formation by means of the hot, scale-inhibited brine.

When the process of the present invention is carried out, the pipes or tubes used in the heat exchange step of the process remain scale free despite repeated and heavy usage, and little or no scale is deposited in the interstices of the hydrocarbon bearing formation after the heating brine has been injected into the formation. Quite importantly, by the use of the indirect heat exchange described, in which the heat exchange interface (represented in the preferred embodiment illustrated by the internal walls or surfaces of the tubes or pipes in the heat exchange chamber 32) is maintained at a relatively low temperature (250° F.) which is essentially the same as that of the surrounding heat exchange medium, the amount of scale inhibitor which must be added to the brine in order to achieve essentially total scale inhibition is minimized. Substantial economies are realized in this way in that by optimizing the pressure, and the temperature of the heat exchange interface, the total cost of scale inhibitor required to achieve substantially total scale inhibition, and to avoid deposition of scale in the formation interstices, is significantly reduced.

Although a preferred embodiment of the invention has been herein described, it will be appreciated and understood that various changes and modifications in the illustrated and described embodiment of the invention, and in the described steps of the process, can be effected without departure from the basic principles of the invention. For example, various other ways of assuring that very hot surfaces are not made to constitute the heat exchange interface or boundary can be employed. Steam may be bubbled through the brine, and other heat exchange media than steam may be used in indirect heat exchange by transfer of thermal energy across a pipe or tube wall or other boundary. The critical aspect of the heat exchange carried out in accordance with the invention is that the heat transfer to the brine occur across a heat exchange interface at which the temperature does not exceed about 400° F. This will be generally adequate for essentially any secondary recovery requirement, and for most usages 300° F. will suffice.

The modifications described and other possible changes are of a character which, though constituting modifications to the described preferred embodiment, remain within the spirit and scope of the invention. It is intended that the scope of the invention not be circumscribed, except to the extent required by limits imposed when the appended claims are assigned a reasonable range of equivalents.

What is claimed is:

1. A method of recovering residual hydrocarbons from a subterranean formation comprising:
   extending an injection well and a producing well into the formation at horizontally spaced locations;
   treating water containing in excess of 1,000 ppm total dissolved solids, and significant quantities of scale-forming ions, with a water soluble scale inhibitor compound in the minimum amount of such inhibitor required to maintain at least 90% of the scale forming ions in solution during subsequent heating of the water to a temperature not exceeding 400° F.;
   heating the water by contact with a heat exchange medium having a temperature not exceeding 400° F.; then
   pumping the heated water containing the inhibitor down the injection well and into the formation under a pressure adequate to displace hydrocarbons toward the production well.

2. The method defined in claim 1 wherein the water is heated by passing the water through heat exchange tubes having an internal skin temperature in contact with the water passed therethrough not exceeding 250° F.

3. The method defined in claim 2 wherein said tubes have smooth internal surfaces contacted by the water being passed therethrough.

4. The method defined in claim 1 and further characterized as including the step of maintaining the water during heating and during the pumping of the heated water at a pressure of at least 200 psig.

5. The method defined in claim 2 wherein said tubes are heated by passing steam into contact with the outer walls of said heat exchange tubes.

6. The method defined in claim 1 wherein the inhibitor used is an organic scale inhibitor compound selected from the group consisting of aminomethylenephosphonate compounds and disphosphonate compounds.

7. The method defined in claim 1 wherein the water treated is a water obtained from a subterranean source at the injection well site.

8. The method defined in claim 1 wherein the water treated has a Stiff and Davis Stability Index exceeding +0.1.

9. The method defined in claim 1 wherein the water contains calcium ions and $HCO_3^-$ ions in an amount sufficient to form at least 75 mg of calcium carbonate scale per liter of the water at a temperature of 125° F.

10. The method defined in claim 1 wherein said scale forming ions are selected from the group consisting of $Ca^{++}$, $Mg^{++}$, $HCO_3^-$ and $SO_4^=$.

11. The method defined in claim 1 wherein prior to heating the water, the pressure of the water is elevated to a pressure of less than 4000 psig, and as high as can be imposed while avoiding fracturing of the formation, and rupturing of pipes and vessels through which the pressurized water is passed enroute to the formation.

12. The method defined in claim 1 wherein the water is heated by passing the water over a steam coil containing steam heated to a temperature exceeding 250° F.

13. The method defined in claim 6 wherein the water soluble scale inhibitor compound utilized is monoaminomethylenephosphonate.

14. The method defined in claim 11 wherein the inhibitor used is an organic scale inhibitor compound selected from the group consisting of aminomethylenephosphonate compounds and disphosphonate compounds.

15. The method defined in claim 11 wherein the water contains calcium ions and $HCO_3^-$ ions in an amount sufficient to form at least 75 mg of calcium carbonate scale per liter of the water at a temperature of 125° F.

16. The method defined in claim 14 wherein the water contains calcium ions and $HCO_3^-$ ions in an amount sufficient to form at least 75 mg of calcium carbonate scale per liter of the water at a temperature of 125° F.

* * * * *